(12) United States Patent
Jung et al.

(10) Patent No.: US 11,910,767 B2
(45) Date of Patent: *Feb. 27, 2024

(54) DISPLAY MODULE AND PLANT CULTIVATION APPARATUS EQUIPPED WITH DISPLAY MODULE

(71) Applicant: LG ELECTRONICS INC., Seoul (KR)

(72) Inventors: Yong Ki Jung, Seoul (KR); Tae Yang Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,534

(22) Filed: Mar. 2, 2023

(65) Prior Publication Data

US 2023/0200308 A1    Jun. 29, 2023

Related U.S. Application Data

(62) Division of application No. 17/064,943, filed on Oct. 7, 2020, now Pat. No. 11,602,105.

(30) Foreign Application Priority Data

Oct. 21, 2019  (KR) .......................... 10-2019-0130915

(51) Int. Cl.
*A01G 9/14* (2006.01)
*A01G 9/24* (2006.01)
*G06F 1/18* (2006.01)
*A01G 7/04* (2006.01)

(52) U.S. Cl.
CPC ............ *A01G 9/249* (2019.05); *A01G 7/045* (2013.01); *G06F 1/181* (2013.01); *G06F 1/189* (2013.01)

(58) Field of Classification Search
CPC ... A01G 9/26; A01G 9/24; A01G 9/14; A01G 9/20; A01G 9/023; A01G 9/022; A01G 9/02; A01G 31/06; A01G 9/249
See application file for complete search history.

(56) References Cited

U.S. PATENT DOCUMENTS

| | | | |
|---|---|---|---|
| 11,064,660 B1 * | 7/2021 | Adams | A01G 29/00 |
| 2019/0183062 A1 * | 6/2019 | Pham | A01G 9/022 |
| 2021/0084828 A1 * | 3/2021 | Hunter | H05B 45/20 |
| 2021/0084836 A1 * | 3/2021 | Hunter | A01G 9/16 |

(Continued)

FOREIGN PATENT DOCUMENTS

KR    10-1348486    1/2014

OTHER PUBLICATIONS

United States Notice of Allowance dated Nov. 8, 2022 issued in co-pending related U.S. Appl. No. 17/064,943.

*Primary Examiner* — Monica L Perry
(74) *Attorney, Agent, or Firm* — KED & ASSOCIATES

(57) ABSTRACT

A display module and a plant cultivation apparatus equipped with a display module are provided. The display module in which a control panel that controls a plant cultivation environment and an output that outputs a state of the plant cultivation environment are provided in a front surface thereof coupled to a structure of a bed and withdrawable and insertable into the plant cultivation apparatus together with the bed. The display module may be located at a front surface of the bed, so that usability and space efficiency may be increased.

20 Claims, 5 Drawing Sheets

(56) References Cited

U.S. PATENT DOCUMENTS

2021/0224979 A1* 7/2021 Hunter ...................... G06T 7/62
2022/0071107 A1* 3/2022 Lee ........................ A01G 9/249
2022/0174890 A1* 6/2022 Wantland ............. A01G 31/047
2022/0287248 A1* 9/2022 Wantland ............. G05B 19/042

* cited by examiner

DISPLAY MODULE AND PLANT CULTIVATION APPARATUS EQUIPPED WITH DISPLAY MODULE

CROSS-REFERENCE TO RELATED APPLICATIONS

This application is a Divisional Application of prior U.S. patent application Ser. No. 17/064,943 filed Oct. 7, 2020, which claims priority under 35 U.S.C. § 119 to Korean Patent Application No. 10-2019-0130915 filed Oct. 21, 2019, whose entire disclosures are hereby incorporated by reference.

BACKGROUND

1. Field

A display module and plant cultivation apparatus equipped with a display module are disclosed herein.

2. Background

Generally, a plant cultivation apparatus is an apparatus used indoors having an environment in which plants can be grown in a cultivation room inside of a cabinet thereof. The plant cultivation apparatus is equipped with a bed supplied with soil and moisture to grow the plants, and a light emitting diode (LED) module installed at an upper portion of the bed, that is, at an upper portion of the cultivation room, to provide LED light close to natural light for plant photosynthesis. The plant cultivation apparatus is equipped with an air circulation device that provides oxygen and carbon dioxide required for plant respiration. The plant cultivation apparatus is capable of providing a series of cultivation environments for plant growth, so it is possible to grow the plants to a desired growth degree in the cultivation room of the apparatus.

The plant cultivation apparatus is equipped with a display module that controls the environment in the cultivation room to be directly controlled by a user. The user can control a cultivation environment required for plant growth through the display module. The display module may be installed in a door, which selectively opens and closes the plant cultivation apparatus, or an outer surface of the cabinet forming the cultivation room, so that the user can easily manipulate the cultivation environment.

However, when the display module is installed in the door, in a state in which the door is opened, an outer surface of the door is located at an opposite side to the user, so the user has to return the door to the closed position in order to manipulate the display module, or the user has to shift the his or her location to the display module located on the outer surface of the opened door. Further, when the display module is installed in the door, it is difficult to secure a wiring space because signal lines and power lines connected to various devices in the cabinet should be connected to the door.

When the display module is installed in the outer surface of the cabinet, usability may be increased. However, in the case of a built-in type plant cultivation apparatus, the outer surface of the cabinet other than the door is not exposed to the user. Further, the display module interferes with surroundings causing a malfunction in which a button of the display module is pressed accidentally. When a bed with a forward ejection structure is ejected forward, there is inconvenience in that the user has to extend his or her arm further than the ejected bed to manipulate the display module.

BRIEF DESCRIPTION OF THE DRAWINGS

Embodiments will be described in detail with reference to the following drawings in which like reference numerals refer to like elements, and wherein.

DETAILED DESCRIPTION

Figure 1:
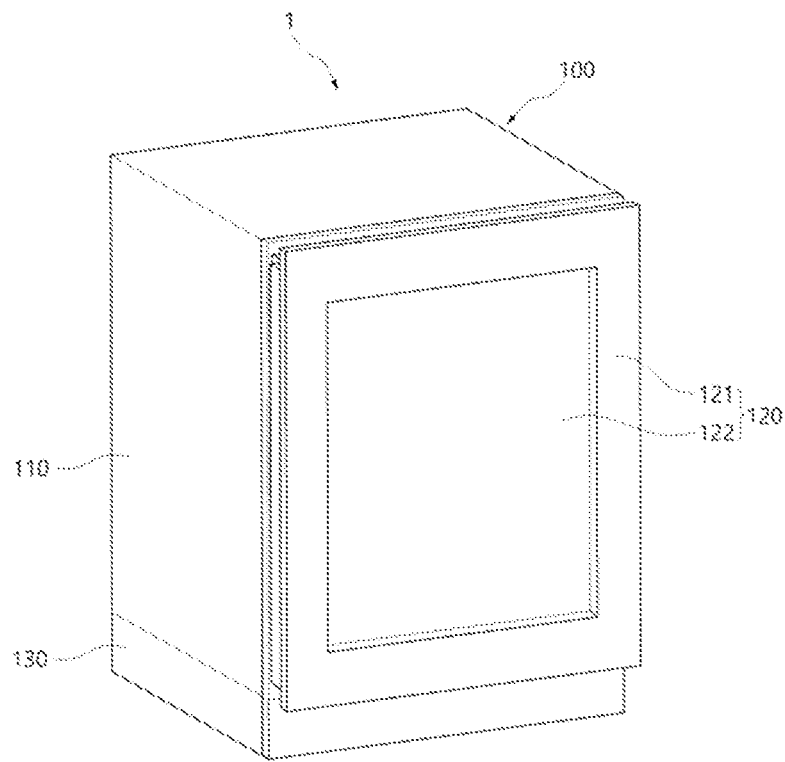
FIG. 1 is a perspective view of a plant cultivation apparatus according to an embodiment, the apparatus in a state in which a door is closed.

Hereinbelow, embodiments will be described with reference to the accompanying drawings. Like reference numerals are used to identify like elements throughout different drawings. Further, in the following description, if it is decided that description of known function or configuration related to embodiments makes the subject matter unclear, description has been omitted.

Further, when describing components, terms such as first, second, A, B, (a), or (b) may be used. As these terms are provided merely for the purpose of distinguishing the components from each other, they do not limit the nature, sequence, or order of the components. It will be understood that when an element is referred to as being "coupled" or "connected" to another element, it can be directly coupled or connected to the other element or intervening elements may be present therebetween.

Figure 2:
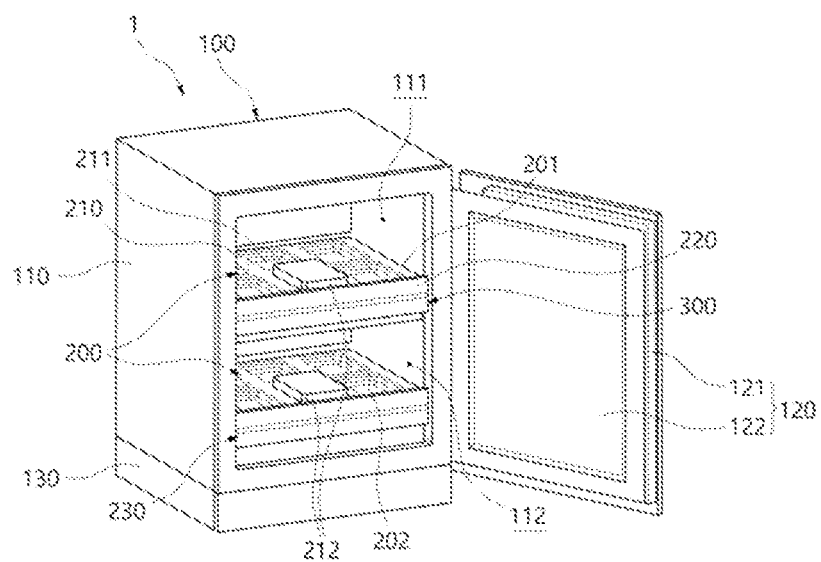
FIG. 2 is a perspective view of the plant cultivation apparatus according to an embodiment, the apparatus in a state in which the door is opened.
Figure 3:
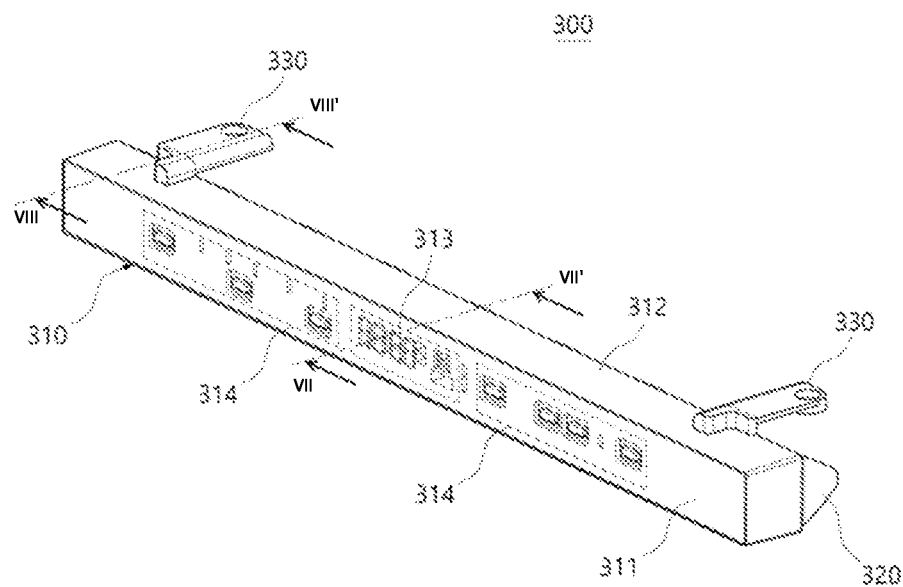
FIG. 3 is a perspective view of a display module according to an embodiment.
Figure 4:
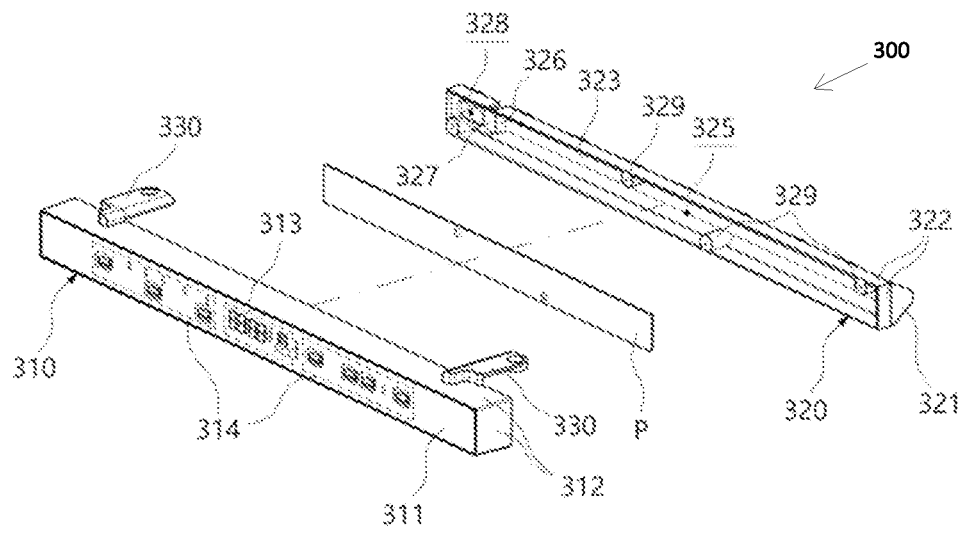
FIG. 4 is an exploded-perspective view of the display module according to an embodiment.
Figure 5:
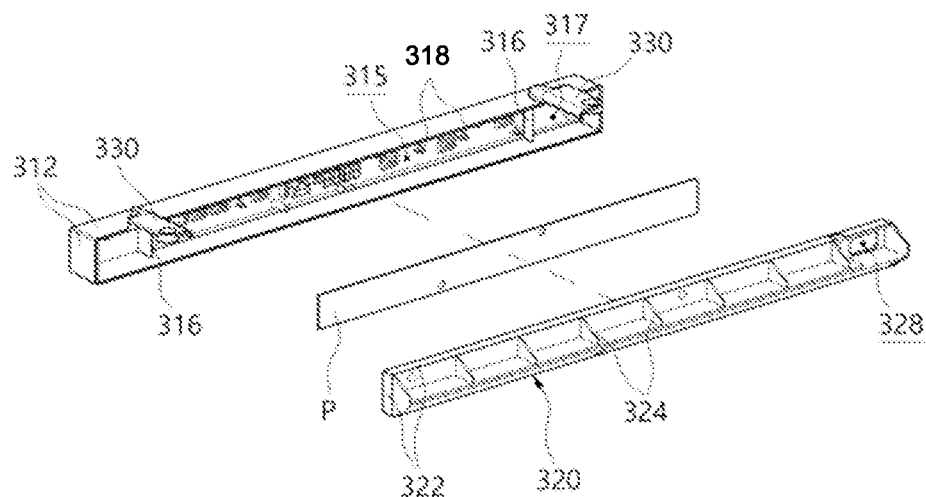
FIG. 5 is an exploded-perspective view of the display module according to an embodiment from a different angle from FIG. 4.
Figure 6:
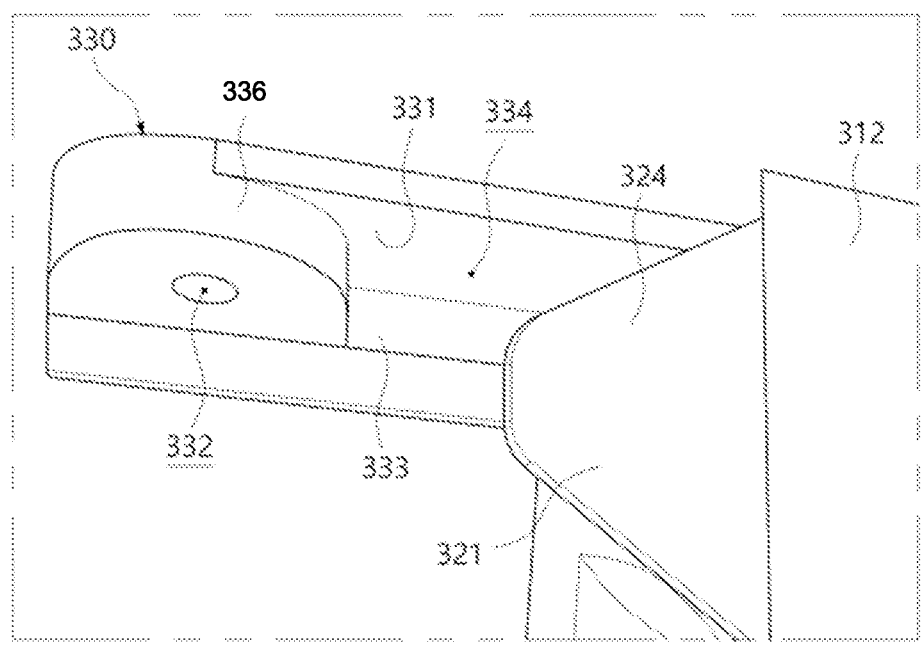
FIG. 6 is a perspective view showing a mounting bracket of the display module according to an embodiment.

In FIGS. 1 and 2, a plant cultivation apparatus 1 according to an embodiment is shown. FIG. 1 is a perspective view of plant cultivation apparatus 1 according to an embodiment. FIG. 2 is a view showing a state in which door 120 is opened to expose an inside of the plant cultivation apparatus 1. The plant cultivation apparatus 1 has a cabinet 100 forming an exterior thereof, and the cabinet 100 may include a casing 110, the door 120, and a machine chamber frame 130.

The casing 110 has a cultivation room 111, 112 therein. A plant may be cultivated in the cultivation room 111, 112. When the door 120 closes the cultivation room 111, 112, an environment in which the plant may be cultivated may be created in the cultivation room 111, 112 by operations of machines installed in the machine chamber frame 130.

The cultivation room 111, 112 may be partitioned by a bed 200 which will be described hereinafter. In this embodiment, the cultivation room 111, 112 may be partitioned into first cultivation room 111 and second cultivation room 111 by the bed 200 installed at a middle (in a vertical direction) of the cultivation room 111, 112.

The door 120 may be configured to open and close the cultivation room 111, 112 of the casing 110. The cultivation room 111, 112 may be air-sealed by the door 120. The door 120 may be configured as a rotary-type opening and closing structure by a hinge structure or a sliding-type opening and closing structure by a rail structure, and may selectively seal the cultivation room 111, 112. In this embodiment, door 120 is shown as a rotary-type opening and closing structure with a hinge structure; however, embodiments are not limited thereto.

The door 120 may include a door frame 121 having a square frame structure with an open inside, and a sight glass 122 that blocks the open inside of the door frame 121. Through the sight glass 122, a user may visually check the cultivation room 111, 112 even when the door 120 is closed. The sight glass 122 may be configured as glass or a display panel through which the inside of the cultivation room 111, 112 may be selectively visible.

A cooling and heating cycle may be configured in the machine chamber frame 130. The cycle may maintain a good temperature for plant growth in the cultivation room 111, 112.

The bed 200 may be installed in the cultivation room 111, 112. The bed 200 may include at least one bed, and the at least one bed may partition the cultivation room 111, 112. In this embodiment, the at least one bed may be configured as first bed 201 and second bed 202. The first bed 201 may be installed at the middle (in the vertical direction) of the casing 110 to partition the cultivation room 111, 112 into the first cultivation room 111 and the second cultivation room 111, and the second bed 202 may be installed at a bottom of the second cultivation room 111.

Each of the first bed 201 and the second bed 202 may be provided with a seating plate 210. The seating plate 210 may include a seat 211, and a pod 212 may be seated on the seat 211. The first bed 201 and the second bed 202 may be installed inside of the casing 110 in a sliding manner by a pair of guide rails 400, which will be described hereinafter, so that the beds 201 and 202 may be ejected or withdrawn forward from the cultivation room 111, 112. The bed 200 may be ejected from or retracted into the cultivation room 111, 112 by a handle 220 provided at a front surface of the seating plate 210.

The pod 212 seated on the seat 211 may be supplied with moisture by a water supply module 230 installed above the machine chamber frame 130 to allow the plant to grow. The above configurations are not main features of embodiments disclosed herein, so descriptions of shapes and functions thereof have been omitted.

A display module 300 may be installed at a lower end of the first bed 201. The display module 300 may be installed anywhere in the casing 110; however, in this embodiment, the display module 300 is installed at the lower end of the first bed 201. A light emitting diode (LED) module 500 (See FIG. 10) may be installed on or at a surface facing the seating plate 210. The display module 300 may be installed on or at a front surface of the LED module 500, so that the LED module 500 is not exposed outward through the sight glass 122. Further, the display module 300 may be installed at the pair of guide rails 400 together with the first bed 201, so that, when the first bed 201 is ejected or withdrawn, the display module 300 may be ejected or withdrawn together with the first bed 201.

The display module 300 may be provided in the casing 110, or may be provided in the door 120. In this embodiment, the display module 300 is configured to be seated on the lower end of the first bed 201.

The display module 300 not only displays each state of the plant cultivation apparatus, but also performs various controls. Each state displayed through the display module 300 may be a temperature in the cultivation room 111, 112, a cultivation time, and operational states, for example.

FIGS. 3 to 8 are views showing the display module 300. The display module 300 may include a front housing 310, a rear housing 320, and a circuit board P. The front housing 310 may include a front surface 311 having a plate shape that extends lengthways in one or a first direction, and a first side surface 312 formed along an edge of the front surface 311.

The front surface 311 may have an output 313 and a control panel(s) 314. A user may control a cultivation environment required for plant growth, such as temperature, light quantity, and air volume, for example, through the control panel 314 provided in the front surface 311. Further, the user may check current states, temperature, and/or humidity, for example, of the cultivation room 111, 112 through the output 313.

The control panel 314 may be operated by a physical button or through a touch screen integrally formed with the output 313. In this embodiment, the output 313 is located at a middle of the front surface 311, and the control panel 314 is provided at each of opposite sides of the output 313. However, embodiments are not limited to this arrangement, and the output 313 and the control panel 314 may be arranged in or at the front surface 311 in various ways.

The first side surface 312 may be provided along the edge of the front surface 311. The front surface 311 and the first side surface 312 may provide a board installation space 315 open at one side thereof. The board installation space 315 may be open toward the rear housing 320, so that a portion of the rear housing 320 may be inserted and the circuit board P seated. That is, when the circuit board P is seated in the board installation space 315, the circuit board P may be pressed and locked by the rear housing 320.

In the board installation space 315, at least one support plate 316 may be formed to extend from the front surface 311 toward an opening of the board installation space 315. The at least one support plate 316 may extend in a direction perpendicular to a longitudinal direction of the front surface 311. The at least one support plate 316 may be configured as a plurality of support plates 316. The plurality of support plates 316 may support opposite edges of the circuit board P.

A connection space 317 may be provided in the front housing 310 outside of the board installation space 315 on the basis of the support plate 316. The connection space 317 may be a space between the first side surface part 312 and the support plate 316. That is, the connection space 317 may be provided between the first side surface 312 and the board installation space 315. A plurality of wires W (see FIG. 8) connected from the circuit board P may be arranged in the connection space 317.

At least one support protrusion 318 and at least one first fixing protrusion 319 may protrude in the board installation space 315 from the front surface 311 toward the opening of the board installation space 315. The at least one support protrusion 318 and the at least one first fixing protrusion 319 may support the circuit board P, so that the circuit board P does not contact the front surface 311 in the board installation space 315 and may be spaced apart from the front surface part 311 at a predetermined distance.

The at least one support protrusion 318 may be configured as a plurality of protrusions to support the circuit board P. A fastening device, such as a bolt, may be inserted into the at least one first fixing protrusion 319 to fix the front housing 310 and the circuit board P.

The rear housing 320 may be coupled to the front housing 310. The rear housing 320 may be configured such that a rear surface 321 and a second side surface 322 provide an exterior of the rear housing 320, and a wiring space 325 open at one side thereof may be provided in the rear housing 320.

The rear surface 321 may extend lengthways in a direction parallel to the front surface 311, and protrude in a direction opposite to a direction in which the front housing 310 and the rear housing 320 are coupled to each other. By the above structure, as an area of the wiring space 325 is wider than when the rear surface 321 has a plate shape, the wiring space 325 for the plurality of wires W extended from the circuit board P is secured.

The second side surface 322 may extend along an edge of the rear surface 321. As the second side surface 322 is formed along the edge of the rear surface 321, the wiring space 325 open at one side is provided. The second side surface 322 may be inserted into the board installation space 315 and an end thereof may press the circuit board P.

A recessed surface 323 may be formed in the rear surface 321. The recessed surface 323 may have a plate shape formed by recessing one side of the rear surface 321 in a longitudinal direction thereof. The second side surface 322 may be partially formed at an edge of the recessed surface 323. The recessed surface 323 may be extend perpendicular to a protruding direction of the rear surface 321 and parallel to the front surface 311 to face the front surface 311. A portion of the LED module 500 may be seated in a space, the space being formed outside of the rear surface 321 by the recessed surface 323.

At least one reinforcement rib 324 may be provided on an outer surface of the rear housing 320. The at least one reinforcement rib 324 may connect the rear surface 321 to the recessed surface 323. A plurality of reinforcement ribs 324 may be spaced apart from each other at a predetermined distance in the longitudinal direction of the rear surface 321. Shapes of the reinforcement ribs 324 may be formed to correspond to a shape of a front surface of the LED module 500, match with the front surface of the LED module 500, and support the LED module 500.

The wiring space 325 may be open toward the front housing 310. The plurality of wires W that extend from the circuit board P may be received in the wiring space 325. In particular, in the wiring space 325, as a portion at which the recessed surface 323 is provided is narrow, the plurality of wires W is not received in this space, but rather, wiring is concentrated in a portion where the rear surface 321 is provided and protrudes.

A step 326 may be provided at one or a first end of the recessed surface 323 that protrudes toward the front housing 310, and a connector support surface 327 may be provided in the step 326. The connector support surface 327 may be provided in or at a location corresponding to the connection space 317. The connector support surface 327 may have a connector hole 328, and an external connector (not shown) may be inserted into the rear housing 320 through the connector hole 328 to be electrically connected to the circuit board P.

When the step 326 protrudes toward the front housing 310, the connector support surface 327 is shown as a more recessed surface than the recessed surface 323 when viewed from the rear of the rear housing 320. Therefore, the step 326 may serve to guide the connector to the connector support surface 327. Further, one surface of the support plate 316 may be supported by the step 326.

At least one second fixing protrusion 329 may be formed in the wiring space 325 to protrude toward the opening of the wiring space 325. The at least one second fixing protrusion 329 may protrude in a coupling direction of the rear housing 320 from the recessed surface 323 or the rear surface 321. The at least one second fixing protrusion 329 may press the circuit board P, and a fastening device, such as a bolt, may be inserted into the at least one second fixing protrusion 329 to couple the circuit board P to the rear housing 320. The at least one second fixing protrusion 329 may be provided in or at a position corresponding to the at least one first fixing protrusion 319 and may be configured so as to simultaneously fix the front housing 310, the circuit board P, and the rear housing 320 by the fastening device.

The display module 300 may be mounted at the lower end of the first bed 201 by mounting brackets 330 provided in the front housing 310. The mounting brackets 330 may be provided in or at the first side surface 312. In this embodiment, as the display module 300 has a structure in which the second side surface 322 is inserted into the board installation space 315 of the front housing 310, the mounting brackets 330 may be provided in the first side surface 312. When the display module 300 has a structure in which the first side surface 312 is inserted into the wiring space 325 of the rear housing 320, the mounting brackets 330 may be provided in the second side surface 322.

Each of the mounting brackets 330 may include a mounting plate 330, a mounting wall 333, and a connection portion 335. The mounting plate 331 may be in close contact with the lower end of the first bed 201. The mounting plate 331 may have a plate shape, and be provided to extend in a direction perpendicular to the longitudinal direction of the front surface 311. The mounting plate 331 may extend parallel to the first side surface 312, and extend in a coupled direction of the front housing 310. A mounting hole 332 may be formed in the mounting plate 331. A fastening device may be inserted through the mounting hole 332 to be fixed to the lower end of the first bed 201.

The mounting wall 333 may extend in a direction perpendicular to the mounting plate 331. The mounting wall 333 may extend perpendicular to an outer surface of the first side surface 312 to space the mounting plate 331 apart from the outer surface of the first side surface 312 at a predetermined distance.

A receiving space 334 may be formed surrounded by the mounting plate 331 and the mounting wall 333. The receiving space 334 may receive a hook arm 410 of each of the guide rails 400. The hook arm 410 may be supported by being in close contact with the mounting plate 331 in the receiving space 334. The above structure will be described hereinafter.

The connection portion 335 may protrude from the first side surface 312. The connection portion 335 may connect the mounting plate 331 and the mounting wall 333 to the first side surface 312. The connection portion 335 may be formed on the first side surface 312 to connect the mounting plate 331 and the mounting wall 333 to the first side surface 312. However, the connection portion 335 may not protrude above a height of the mounting wall 333, that is, may not protrude more than a distance from the first side surface 312 to the mounting plate 331. This is because the connection portion 335 is in close contact with the lower end of the first bed 201 to minimize a gap between the lower end of the first bed 201 and the mounting plate 331.

The mounting plate 331 may have a mounting reinforcement portion 336 that protrudes toward the receiving space 334. The mounting reinforcement portion 336 may be formed at an edge of the mounting hole 332. That is, the mounting hole 332 may pass through the mounting reinforcement portion 336. The mounting reinforcement portion 336 may reinforce a thickness of the mounting plate 331 to prevent damage to the mounting plate 331 by the fastening device inserted in the mounting hole 332.

A process of assembling the display module 300 will be described hereinafter.

The front housing 310 and the rear housing 320 may be arranged to face each other, such that the opening of the board installation space 315 of the front housing 310 and the opening of the wiring space 325 of the rear housing 320 are arranged to face each other. The circuit board P may be arranged between the front housing 310 and the rear housing 320.

The circuit board P may be seated in the board installation space 315. The circuit board P may be supported by the plurality of support protrusions 318 and the at least one first fixing protrusion 319 and seated in the board installation space 315 while being spaced apart from the front surface 311 at a predetermined distance. In addition, opposite sides of the circuit board P may be supported by the support plates 316 provided in the board installation space 315. Accordingly, the circuit board P may be prevented from moving in the longitudinal direction of the front housing 310 in the board installation space 315.

Figure 7:
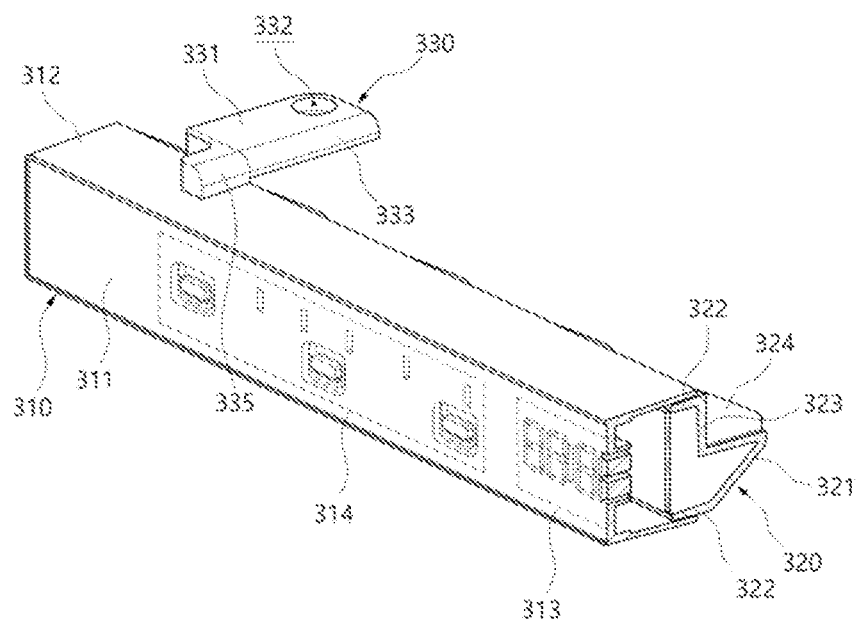
FIG. 7 is a cross-sectional perspective view, taken along line VII-VII' in FIG. 3.
Figure 8:
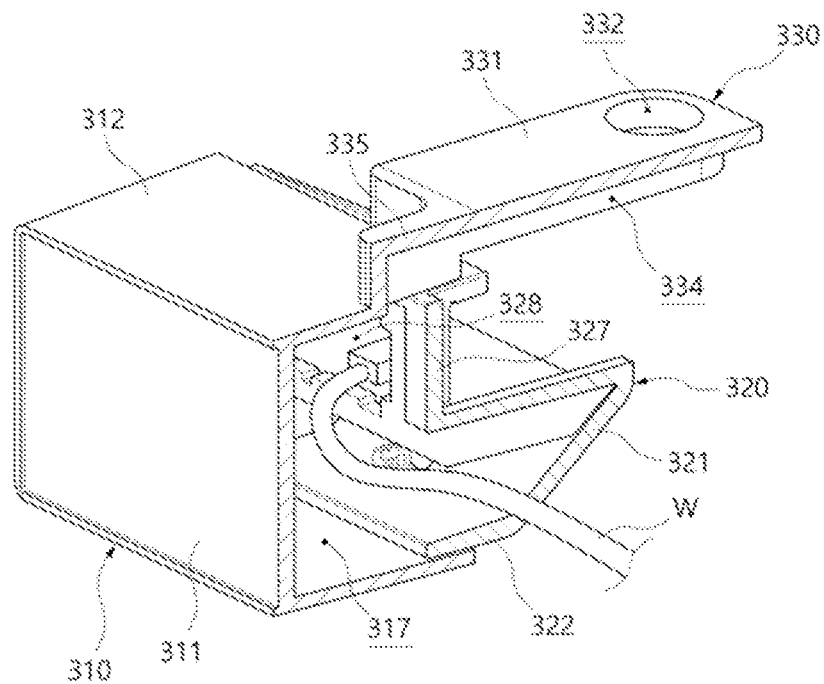
FIG. 8 is a cross sectional perspective view taken along line VIII-VIII' in FIG. 3.
Figure 9:
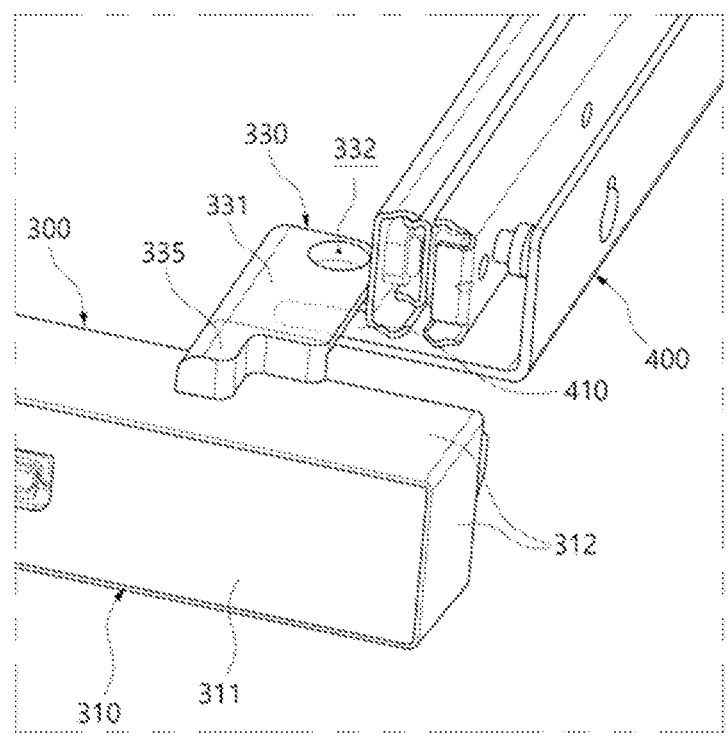
FIG. 9 is a perspective view showing a state in which the display module according to an embodiment is hooked to a hook arm of a guide rail.

Referring to FIG. 7, the rear housing 320 may be inserted into the board installation space 315. When the front housing 310 and the rear housing 320 are coupled to each other, an outer surface of the second side surface 322 of the rear housing 320 may be located at an inner surface of the first side surface 312, and an end of the second side surface 322 may support a rear surface of the circuit board P.

The plurality of wires W may be connected to the rear surface of the circuit board P facing the rear housing 320, and the plurality of wires W may be received in the wiring space 325. The plurality of wires W may extend from the wiring space 325 to a location at which the connector support surface 327 is located. The plurality of wires W may pass through the wiring space 325, and be curved from a lower end of the connector support surface 327 to the connection space 317 of the front housing 310 to be connected to the external connector through the connector hole 328.

A process by which the display module 300 is installed at the first bed 201 will be described hereinafter.

The pair of guide rails 400 may be arranged at opposite sides of the first bed 201 in parallel to each other. The first bed 201 may perform a linear reciprocating motion of being ejected or retracted from the casing 110 by guidance of the pair of guide rails 400. The display module 300 may be installed at the lower end of the first bed 201 partitioning the cultivation room 111, 112. At the lower end of the first bed 201, not only the display module 300, but also the LED module 500, which provides an amount of light so that the plant growing in the second bed 202 may photosynthesize, may be installed.

Respective hook arms 410 may protrude from ends of the pair of guide rails 400 in facing directions. Each of the hook arms 410 may be received in the receiving space 334 of each of the mounting brackets 330, and the hook arm 410 and an inner surface of the mounting plate 331 may be in contact with each other. That is, the display module 300 may be supported such that the mounting plate 331 is hooked to the hook arm 410, and fixed to the lower end of the first bed 201 through the fastening device inserted through the mounting hole 332.

Figure 10:
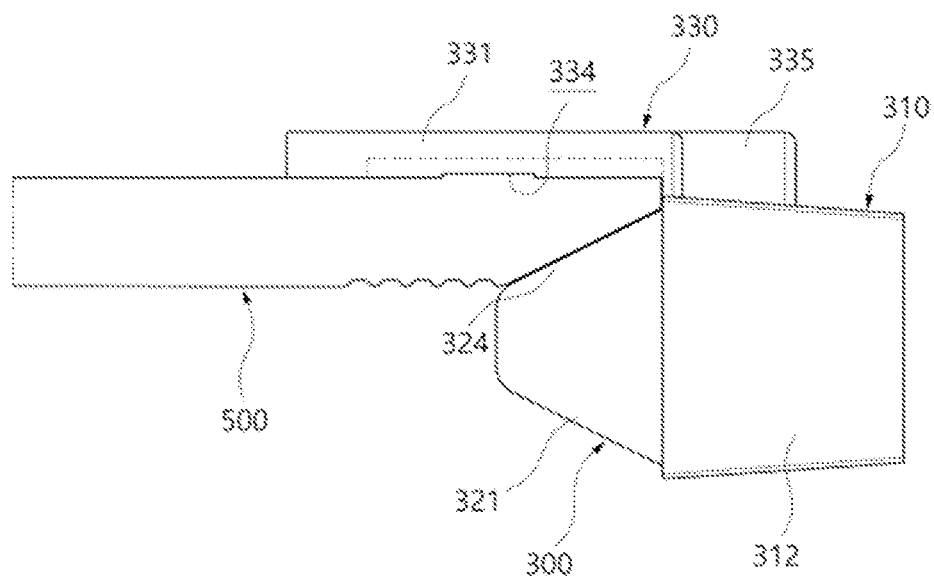
FIG. 10 is a side view showing a state in which the display module according to an embodiment mates with an LED module.

Referring to FIG. 10, the LED module 500 may be coupled to the rear housing 320 of the display module 300. The reinforcement rib 324 may be formed to correspond to an edge shape of the LED module 500, so that the rear housing 320 including the reinforcement rib 324 and the LED module 500 may match each other. An end of the LED module 500 may be in contact with the recessed surface 323. When the LED module 500 and the display module 300 match with each other, as shown in FIG. 10, the LED module 500 and the display module 300 may be coupled and fixed to the first bed 201 by the fastening device.

The LED module 500 and the display module 300 may be simultaneously fixed to the first bed 201 by the fastening device inserted through the mounting hole 332. An upper surface of the LED module 500 may be in close contact with a lower surface of the mounting wall 333, and the hook arm 410 may be received in the receiving space 334. Therefore, the LED module 500 and the hook arm 410 do not interfere with each other.

Embodiments disclosed herein been made keeping in mind the above problems occurring in the related art, and are intended to provide a plant cultivation apparatus in which a display module is provided.

Embodiments disclosed herein provide a display module with a novel structure for being provided in a plant cultivation apparatus.

Embodiments disclosed herein provide a display module configured to cover a LED module so that a lighting portion is not exposed to a user, and may be provided in or at a lower end of a bed. When the display module is provided in or at a front surface of the bed, manipulation by the user may be performed easily, and glare caused by the LED module may be prevented. Further, wires extending from a circuit board may be received through a wiring space of a rear housing so that a wiring design may be easy and be outwardly neat.

In particular, the display module according to embodiments disclosed herein may include a front housing having an output and a control panel on one side surface thereof, and having a mounting bracket on or at an outside surface thereof; a circuit board seated in the front housing; and a rear housing coupled to the front housing, and having a wiring space in which a plurality of wires that extends from the circuit board may be received. The front housing may include a front surface having a plate shape extended lengthways in one or a first direction; a first side surface provided along an edge of the front surface, so that a board installation space open at one side thereof may be provided in the front housing; and the mounting bracket provided at an outside surface of the first side surface and extending in a direction perpendicular to an longitudinal direction of the front surface. The circuit board may be seated in the board installation space.

The control panel that controls a plant cultivation environment and the output that outputs a state in response to control of the control panel may be provided on the front surface. The front surface may include support plates that protrude toward the board installation space in a direction perpendicular to the longitudinal direction of the front surface and support opposite sides of the circuit board; and at least one first fixing protrusion that protrudes toward the board installation space, supports one surface of the circuit board, and spaces the circuit board apart from the front surface at a predetermined distance.

The mounting bracket may include a mounting plate that extends in a direction perpendicular to the longitudinal direction of the front surface, having a mounting hole at an end thereof, and arranged in parallel to the first side surface; a mounting wall that extends from one side of the mounting plate perpendicular to the mounting plate and perpendicular to an outside surface of the first side surface to provide a receiving space together with the mounting plate; and a connection portion that connects the first side surface, the mounting plate, and the mounting wall together. The mounting bracket may include a mounting reinforcement portion that may protrude from the mounting plate toward the receiving space, with the mounting hole passing through the mounting reinforcement portion.

The rear housing may include a rear surface that extends lengthways in one direction, and a second side surface provided along an edge of the rear surface so that the wiring space open at one side thereof is provided in the rear housing. The plurality of wires that extends from the circuit board may be received in the wiring space. The rear surface may protrude in a direction opposite to a coupling direction of the rear housing.

The rear surface may have a recessed surface formed in a longitudinal direction of the rear surface, the recessed surface being formed by recessing one side of the rear surface in a direction perpendicular to the second side surface. The rear housing may include a plurality of reinforcement ribs that connects the recessed surface and the rear surface to each other, the reinforcement ribs being spaced apart from each other along the longitudinal direction of the rear surface.

A step may be formed at one end of the recessed surface by protruding toward an opening of the wiring space. A connector support surface having a connector hole may be formed at an end of the step.

At least one of the recessed surface and the rear surface may have a second fixing protrusion that protrudes toward the opening of the wiring space. The plurality of wires connected to the circuit board may be received in the wiring space, and be connected to an outside by passing through the board installation space and the connector hole.

Embodiments disclosed herein provide a plant cultivation apparatus that may include a cabinet including a cultivation room in which a plant may be cultivated and a door provided that opens and closes the cultivation room; a pair of guide rails provided at edges of the cultivation room; a bed supported by the guide rails in the cultivation room to partition the cultivation room into an upper cultivation room and a lower cultivation room, and configured to perform a linear reciprocating motion relative to the door; a LED module provided on a lower surface of the bed and configured to emit light to the lower cultivation room; and a display module provided at an edge of the lower surface of the bed at a side at which the door is located and extending lengthways in one direction to cover the LED module. The display module may include a control panel that controls a plant cultivation environment and an output that outputs a state in response to control of the control panel.

Ends of the pair of guide rails may have respective hook arms that extend in facing directions thereof. The display module may have mounting brackets at an outside surface thereof, and the mounting brackets may be supported by being hooked to the respective hook arms.

Each of the mounting brackets may include a mounting plate that extends in a direction perpendicular to a longitudinal direction of the display module, having a mounting hole at an end thereof, and arranged to extend in parallel to the outside surface of the display module; a mounting wall that extends from one side of the mounting plate perpendicular to the mounting plate and perpendicular to an outside surface of the display module to provide a receiving space together with mounting plate; and a connection portion that connects the outside surface of the display module, the mounting plate, and the mounting wall together.

Each of the mounting brackets may include a mounting reinforcement portion that may protrude from the mounting plate toward the receiving space, with the mounting hole passing through the mounting reinforcement portion. Each of the hook arms may be received in the receiving space The display module may have an outer shape corresponding to a shape of an end of the LED module.

As described above, the display module according to embodiments disclosed herein may have at least the following advantages.

The display module according to embodiments disclosed herein may be provided in the lower end of the bed configured to be ejected forward. Therefore, as a separate space for installing the display module is not necessary, space efficiency may be increased.

The display module according to embodiments may be configured to cover a front surface of the LED module provided in the lower end of the bed. Therefore, the display module may be safety secured because a user cannot directly see light emitted from the LED module, and an aesthetic factor may be increased as the display module covers the LED module so that the LED module is not viewable from the outside.

Further, the mounting bracket of the display module may be provided in the lower end of a first bed by a fastening device, and the display module may be supported stably by distributing its weight to a guide arm formed on a guide rail that supports and moves the first bed forward.

Hereinabove, just because all elements constituting embodiments disclosed herein have been described as being coupled into one or being operated in combination, embodiments are not necessarily limited to disclosed embodiments. Within the scope of the purpose, all one or more elements may be selectively coupled to each other and operated. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although the invention is described with reference to specific items such as specific structural elements, to merely some embodiments, and to drawings, such specific details disclosed herein are merely representative for purposes of helping more comprehensive understanding of the present disclosure. Embodiments, however, are not limited to only the embodiments set forth herein, and those skilled in the art will appreciate that embodiments may be embodied in many alternate forms. Accordingly, the embodiments are intended to cover not only the exemplary embodiments, but also various alternatives, modifications, equivalents and other embodiments that may be included within the spirit and scope as defined by the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A plant cultivation apparatus, comprising:
    a cabinet comprising a cultivation room in which a plant is cultivated and a door that opens and closes the cultivation room;
    a pair of guide rails provided at edges of the cultivation room;
    a bed supported by the pair of guide rails in the cultivation room so as to be inserted into and withdrawn from the cultivation room; and
    a display module detachably coupled to a front of the bed so as to be inserted into and withdrawn from the cultivation room together with the bed.

2. The plant cultivation apparatus of claim 1, wherein the display module comprises a control panel that controls a plant cultivation environment and an output that outputs a state in response to control of the control panel.

3. The plant cultivation apparatus of claim 2, wherein ends of the pair of guide rails have respective hook arms that extend in facing directions thereof.

4. The plant cultivation apparatus of claim 3, wherein the display module has mounting brackets at an outside surface thereof and the mounting brackets are supported by being hooked to the respective hook arms.

5. The plant cultivation apparatus of claim 4, wherein each of the mounting brackets comprises:
    a mounting plate that extends in a direction perpendicular to a longitudinal direction of the display module, having a mounting hole at an end thereof, and arranged to extend in parallel to the outside surface of the display module;
    a mounting wall that extends from one side of the mounting plate perpendicular to the mounting plate and perpendicular to the outside surface of the display module to provide a receiving space together with the mounting plate;
    a connection portion that connects the outside surface of the display module, the mounting plate, and the mounting wall together; and a mounting reinforcement portion that protrudes from the mounting plate toward the receiving space, with the mounting hole passing through the mounting reinforcement portion.

6. The plant cultivation apparatus of claim 5, wherein each of the hook arms is received in the receiving space.

7. The plant cultivation apparatus of claim 2, wherein the display module comprises:
a front housing comprising the output and the control panel at a first side surface thereof, and comprising at least one mounting bracket on a second side surface thereof;
a circuit board seated in the front housing; and
a rear housing coupled to the front housing, and having a wiring space in which a plurality of wires that extends from the circuit board is received.

8. The plant cultivation apparatus of claim 7, wherein the front housing comprises:
the first side surface, which is a front surface having a plate shape that extends lengthways in the first direction; and
the second side surface, which is provided along an edge of the front surface, so that a board installation space open at one side thereof is provided in the front housing, wherein a mounting bracket is provided at an outside surface of the second side surface and extends in a direction perpendicular to the first direction, wherein the circuit board is seated in the board installation space, and wherein the control panel and the output are provided on the front surface.

9. The plant cultivation apparatus of claim 8, wherein the rear housing comprises:
a rear surface that extends lengthways in the first direction; and
a third side surface provided along an edge of the rear surface so that the wiring space open at one side thereof is provided in the rear housing, wherein the plurality of wires that extends from the circuit board is received in the wiring space, and wherein the rear surface protrudes in a direction opposite to a coupling direction of the rear housing to the front housing.

10. The plant cultivation apparatus of claim 1, wherein the door comprises a door frame, and a transparent window or display panel, through which an inside of the cultivation room is selectively visible, supported by the door frame.

11. A plant cultivation apparatus, comprising:
a cabinet comprising a cultivation room in which a plant is cultivated and a door that opens and closes the cultivation room;
a pair of guide rails provided at edges of the cultivation room;
a bed supported by the pair of guide rails in the cultivation room so as to be inserted into and withdrawn from the cultivation room; and
a display module detachably coupled at a front of the bed;
wherein the door having a transparent window through which an inside of the cultivation room is selectively visible when the door is closed.

12. The plant cultivation apparatus of claim 11, wherein the display module is inserted into and withdrawn from the cultivation room together with the bed.

13. The plant cultivation apparatus of claim 11, wherein the display module comprises a control panel that controls a plant cultivation environment and an output that outputs a state in response to control of the control panel.

14. The plant cultivation apparatus of claim 13, wherein ends of the pair of guide rails have respective hook arms that extend in facing directions thereof.

15. The plant cultivation apparatus of claim 14, wherein the display module has mounting brackets at an outside surface thereof and the mounting brackets are supported by being hooked to the respective hook arms.

16. The plant cultivation apparatus of claim 15, wherein each of the mounting brackets comprises:
a mounting plate that extends in a direction perpendicular to a longitudinal direction of the display module, having a mounting hole at an end thereof, and arranged to extend in parallel to the outside surface of the display module;
a mounting wall that extends from one side of the mounting plate perpendicular to the mounting plate and perpendicular to the outside surface of the display module to provide a receiving space together with the mounting plate;
a connection portion that connects the outside surface of the display module, the mounting plate, and the mounting wall together; and
a mounting reinforcement portion that protrudes from the mounting plate toward the receiving space, with the mounting hole passing through the mounting reinforcement portion.

17. The plant cultivation apparatus of claim 12, wherein the display module comprises:
a front housing comprising the output and the control panel at a first side surface thereof, and comprising at least one mounting bracket on a second side surface thereof;
a circuit board seated in the front housing; and
a rear housing coupled to the front housing, and having a wiring space in which a plurality of wires that extends from the circuit board is received.

18. The plant cultivation apparatus of claim 17, wherein the front housing comprises:
the first side surface, which is a front surface having a plate shape that extends lengthways in the first direction; and
the second side surface, which is provided along an edge of the front surface, so that a board installation space open at one side thereof is provided in the front housing, wherein the at least one mounting bracket is provided at an outside surface of the second side surface and extends in a direction perpendicular to the first direction, wherein the circuit board is seated in the board installation space, and wherein the control panel that controls a plant cultivation environment and the output that outputs a state in response to control of the control panel are provided on the front surface.

19. The plant cultivation apparatus of claim 18, wherein the rear housing comprises:
a rear surface that extends lengthways in the first direction; and
a third side surface provided along an edge of the rear surface so that the wiring space open at one side thereof is provided in the rear housing, wherein the plurality of wires that extends from the circuit board is received in the wiring space, and wherein the rear surface protrudes in a direction opposite to a coupling direction of the rear housing to the front housing.

20. The plant cultivation apparatus of claim 15, wherein the door comprises a door frame, and the transparent window or display panel supported by the door frame.

* * * * *